United States Patent [19]
Cook et al.

[11] Patent Number: 5,719,451
[45] Date of Patent: Feb. 17, 1998

[54] LINEAR MAGNETIC ACTUATOR

[75] Inventors: Stephen John Cook, Berkshire; Richard Edward Clark, Sheffield, both of United Kingdom

[73] Assignee: Huntleigh Technology PLC, United Kingdom

[21] Appl. No.: 569,199
[22] PCT Filed: May 18, 1995
[86] PCT No.: PCT/GB95/01124
  § 371 Date: Jan. 16, 1996
  § 102(e) Date: Jan. 16, 1996
[87] PCT Pub. No.: WO95/31851
  PCT Pub. Date: Nov. 23, 1995

[30] Foreign Application Priority Data

May 18, 1994 [GB] United Kingdom ............... 9409988

[51] Int. Cl.[6] .................................................. G01P 47/02
[52] U.S. Cl. ........................................ 310/12; 318/135
[58] Field of Search ........................... 310/12, 13, 15; 335/220, 221, 222, 229, 250, 251, 255, 256, 278, 282; 318/135

[56] References Cited

U.S. PATENT DOCUMENTS

| | | |
|---|---|---|
| 3,903,437 | 9/1975 | Mori .................................. 310/12 |
| 4,371,800 | 2/1983 | Brander ............................. 310/15 |
| 4,422,060 | 12/1983 | Matsumoto ....................... 335/256 |
| 4,690,371 | 9/1987 | Bosley et al. ..................... 251/65 |
| 4,945,269 | 7/1990 | Kamm ............................... 310/15 |
| 5,231,337 | 7/1993 | Van Namen ...................... 310/15 |
| 5,339,064 | 8/1994 | Bessho ............................. 335/282 |
| 5,345,206 | 9/1994 | Morcos ............................. 335/222 |

FOREIGN PATENT DOCUMENTS

| | | |
|---|---|---|
| 56-141769 | 11/1981 | Japan . |
| 58-36162 | 3/1983 | Japan . |
| 58-63074 | 4/1983 | Japan . |
| 2214724 | 9/1989 | United Kingdom . |

*Primary Examiner*—Clayton E. LaBalle
*Attorney, Agent, or Firm*—Fitzpatrick, Cella, Harper & Scinto

[57] ABSTRACT

A linear magnetic actuator has a pair of stator windings (14, 15) of opposite polarity formed inside a cylindrical soft iron shell (16) providing a slotless back iron piece. The axially movable shuffle comprises a soft iron shaft (11) with a pair of radially magnetised annular permanent magnets (12 and 13). The arrangement has cylindrical symmetry and the stator windings are as thin as possible to minimise the air gap between the cylindrical pole faces of the annular magnets and the back iron.

19 Claims, 4 Drawing Sheets

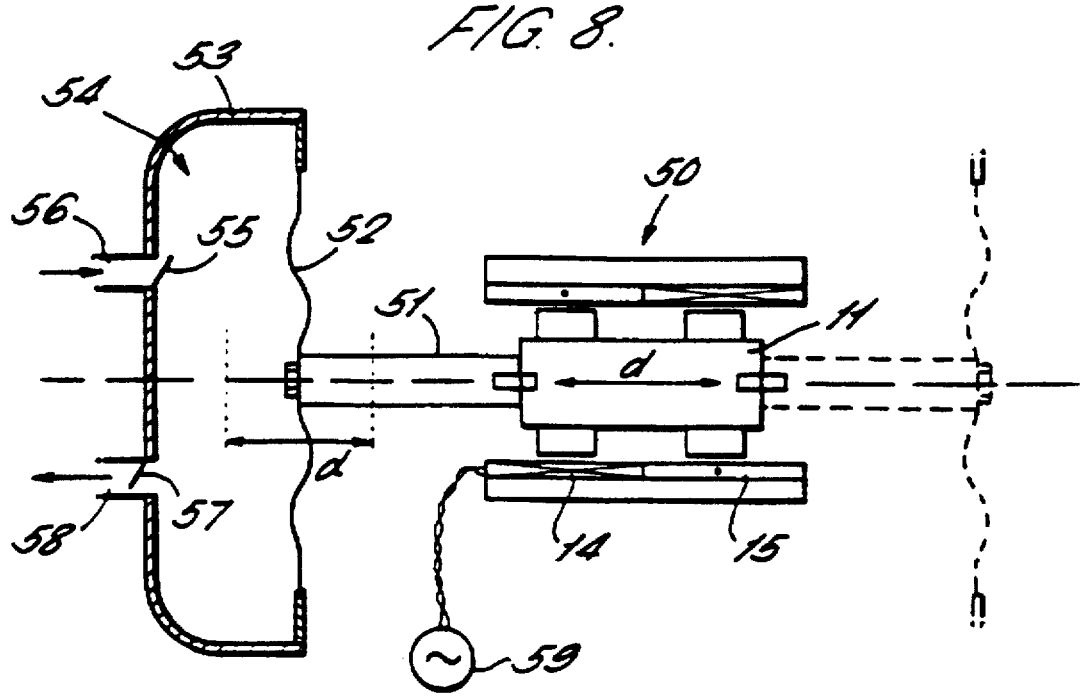
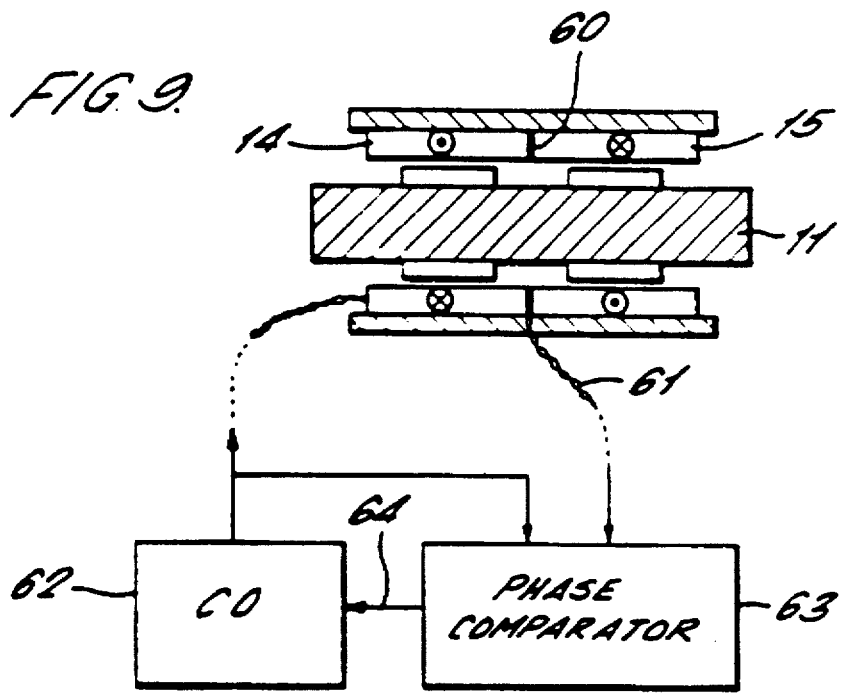

LINEAR MAGNETIC ACTUATOR

The present invention relates to a linear magnetic actuator. Magnetic actuators are known which typically operate in a reciprocating fashion to actuate the diaphragm of a diaphragm pump, for example. Magnetic actuators operate by interaction between a magnetic field and electric current flowing in one or more coils or windings. Typically magnetic actuators include an electromagnet incorporating a fixed core and a winding associated with the core, influencing a movable armature also of soft ferromagnetic material. It is also known to include one or more permanent magnets mounted on the movable actuator member, again influenced by an electromagnet.

Generally, designs known hitherto are intended for low power applications such as aerators for aquariums and little attention has been given to ensuring good magnetic and electrical efficiency.

The present invention provides a linear magnetic actuator comprising a pair of stator windings arranged to carry currents providing magnetic fields of opposed polarity and arranged adjacent to one another along a line substantially perpendicular to the directions of current flow in the windings, a permanent magnet actuator member mounted for movement along a path parallel to said line and having opposite magnetic poles with a predetermined spacing along said path such that in a de-energised state of the actuator each magnetic pole is proximate a respective one of the stator windings, and a slotless stator back iron piece extending parallel to said line behind the stator windings relative to the actuator member and having a face closest to the actuator member which is flat in directions parallel to said line over the extent of the back iron piece.

With this arrangement, the air gap between the magnetic poles of the permanent magnet actuator member and the slotless stator back iron piece is constant as the actuator moves along its path. As a result, high magnetic efficiency can be obtained if this air gap is kept small. Importantly also, there will be no saliency force on the actuator.

Preferably, each magnetic pole has a face which extends a predetermined width along said line and each stator winding comprises a plurality of turns extending evenly along said line for not less than said width of the corresponding pole face. Then, more preferably, the actuator member has a predetermined maximum displacement and each stator winding extends along said line for a distance not substantially greater than said width plus said predetermined displacement.

In fact, each stator winding normally extends for approximately the width of the corresponding magnetic pole face plus the predetermined maximum displacement of the actuator member. Extending the stator coils evenly in the direction of movement of the actuator member has a number of effects and advantages. Firstly, the coil can be made very thin (in the direction of the air gap between the magnetic pole face and the back iron piece) so that the air gap can be minimised. Secondly, the magnetic field distribution relative to the magnetic pole pieces does not vary as the magnetic actuator member moves along its stroke. So long as the stator winding extends along the stroke of the actuator member for a sufficient length, a consistent number of turns of the stator winding interact with the magnetic field for all positions of the actuator member. The result can be an actuator of high magnetic efficiency and highly consistent performance over a range of power outputs.

The stator windings will normally be arranged to carry currents of the same magnitude and may typically be connected in series. However, arrangements may also be contemplated in which currents of different magnitudes flow in the different windings.

It will be understood that energising the stator windings with current of one polarity produces a force on the permanent magnet actuator member, which can move the member along said path unless otherwise restrained at least until one of the poles of the magnet reaches the interface between the two stator windings. If by this position, the other pole of the permanent magnet has moved so that it is no longer under the influence of a stator winding, then the net force on the actuator member is reversed so that the actuator member will not move any further in that direction. On reversal of the polarity of the energising current in the stator windings, the actuator member can move in the opposite direction until the other pole reaches the interface between the two stator windings.

Preferably also, the actuator member has magnetic pole faces extending substantially parallel to said line. With this arrangement, the direction of magnetic flux at the magnetic poles of the actuator member, being substantially normal to the pole faces, is directed also in the direction normal to the axis of the stator windings, thereby maximising the magnetic force on the actuator member in the direction of the path of movement when the stator windings are energised.

Most conveniently, the stator windings are generally cylindrical centred on an axis parallel to said line and the actuator member has cylindrical symmetry about said axis. Then, the actuator member may have pole faces which are themselves substantially cylindrical.

In one embodiment, the actuator member comprises a shaft of soft ferromagnetic material and a pair of oppositely radially magnetised annular permanent magnets located at said spacing along the shaft.

In another embodiment, the actuator member comprises an axially aligned permanent magnet and soft ferromagnetic pole pieces at each end of the magnet to direct magnetic flux radially.

In a still further embodiment, the actuator member comprises a permanent magnet of isotropic magnet material magnetised to direct flux substantially radially at each pole.

With this cylindrical arrangement the stator back iron piece is preferably a cylinder of soft magnetic material surrounding the stator windings.

In a very convenient arrangement, the stator windings comprise at least one flexible substrate sheet of electrically insulating material and a conductive track formed on the substrate in a rectangular spiral, the substrate and track thereon being rolled into a cylinder having its axis parallel to one pair of opposed sides of the rectangular spiral, so that the conductive track elements of the other pair of opposed sides constitute respectively turns of the two opposed polarity stator windings. With this technique, the pair of opposed polarity stator windings can be manufactured at much lower cost compared to winding helical coils from copper wire for example.

The substrate with track thereon may be rolled so that the track elements of said one pair of opposed sides of the spiral substantially overlie one another. Further, the substrate may be rolled to produce more than one layer of substrate and track elements forming the walls of the cylinder.

In a preferred arrangement, the actuator includes a sense coil located at a null field point between the stator windings to sense the velocity of movement of the actuator member. Then the actuator preferably includes a variable frequency oscillator to provide an energising supply to the stator windings and resonance control circuitry responsive to signals from the sense coil indicating the velocity of the actuator member to control the oscillator frequency to bring the actuator into mechanical resonance.

Although the above description talks of a pair of stator windings and a corresponding pair of opposed permanent magnet poles on the actuator member, there may be additional stator windings and poles. Accordingly, the actuator may include at least one additional stator winding adjacent to one of said pair of windings along said line and of opposite polarity to said adjacent winding, and the actuator member may then have a corresponding additional magnetic pole spaced along said path of movement from and of opposite magnetic polarity to an adjacent one of said opposite magnetic poles so as to be proximate said additional stator winding.

Conveniently there may be at least two pairs of stator windings and associated magnetic poles.

By providing more than two magnetic poles, the total amount of magnetic field interlinking a pair of adjacent opposed poles can be reduced, whilst maintaining the same total magnetic field across the air gap and intercepting the stator windings. In this way, the same power can be achieved, but with a reduced amount of soft iron providing the axial link in the actuator member between the opposed magnetic poles. As a result, the total mass of the actuator member can be reduced.

The magnetic actuator described above can have a number of uses but has particular application as the actuator of a diaphragm pump.

Examples of the present invention will now be described with reference to the accompanying drawings in which:

FIG. 8 is a schematic cross-sectional view of a diaphragm pump incorporating a magnetic actuator embodying the present invention;

FIG. 9 is a schematic cross-sectional view of a further embodiment of magnetic actuator incorporating a sense coil and resonant control;

Figure 1:
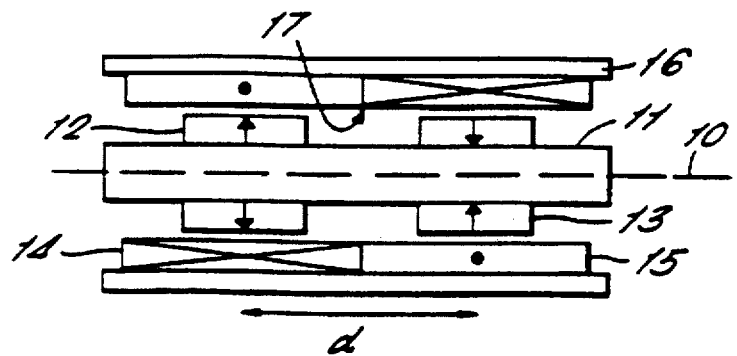
FIG. 1 is a cross-sectional schematic view of a magnetic actuator embodying the present invention.

Referring to FIG. 1, the magnetic actuator is essentially axially symmetric about the axis 10 and includes a central shaft 11 of soft ferromagnetic material. Radially magnetised annular permanent magnets 12 and 13 are mounted on the shaft at a predetermined axial spacing d. The shaft 11 with magnets 12 and 13 thereon is mounted for axial movement within an outer structure comprising a pair of axially extending windings 14 and 15, also centred on the axis 10. The windings 14 and 15 are mounted inside a cylindrical shell 16 of soft ferromagnetic material, providing back iron.

Each of the annular magnets 12 and 13 are magnetised radially with opposite polarity, as indicated by the arrows in FIG. 1, so that between them and the soft iron shaft 11, the magnets 12 and 13 produce in effect a single axially extending magnet with opposite magnetic poles spaced apart by the distance d. This single effective magnet has cylindrical magnetic pole faces, constituted by the outer cylindrical surfaces of the annular magnets 12 and 13. Thus, the magnetic flux from the pole faces provided by annular magnets 12 and 13 is directed radially outwardly towards the stator windings 14 and 15.

The two stator windings 14 and 15 are typically connected in series but with opposite polarity, as illustrated in FIG. 1, so that the same magnitude of current flows in both windings. However, in other arrangements each stator winding may be fed from a separate current sourse so that the current magnitudes in the windings are different. Indeed, provision may be made to turn off the current in one winding completely, e.g. to reduce the power output of the actuator. It can therefore be seen that when an electric current is supplied through the stator windings 14 and 15, the interaction between the current in the windings and the magnetic field from the pole faces of the annular magnets 12 and 13 will produce an axially directed force on the shaft 11. The direction of this force depends on the direction of current flow through the two series connected stator windings. The force on the shaft 11 is substantially constant so long as the annular magnets 12 and 13 are within the range of influence of the two windings 14 and 15 respectively as shown in FIG. 1.

It can be seen that when the shaft 11 moves away from the central position illustrated in FIG. 1, to the right for example, annular magnet 12 will reach the interface 17 between the two stator windings 14 and 15. At this position, the force on the permanent magnet 12 due to the influence of the stator windings 14 and 15 declines to zero and would reverse if the permanent magnet 12 moved into the range of influence of the other opposed stator winding 15. At the same time, in the example illustrated, the permanent magnet 13 begins to move out of the influence of the stator winding 15 so that the force on magnet 13 also declines towards zero. As a result, the displacement of the shaft 11 on energising the stator windings is limited substantially to the distance d, or a bit more to allow the declining force on magnet 13 as it moves out of winding 15 to be balanced by the increasing force in the reverse direction on magnet 12 as it passes the interface between windings 14 and 15.

Figure 2:
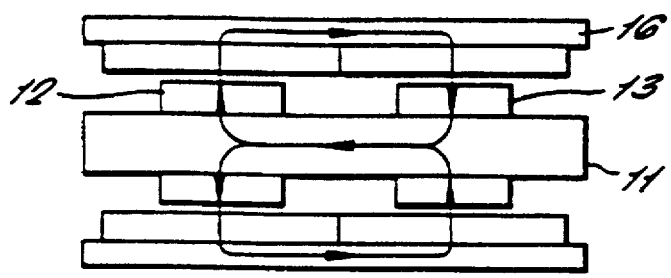
FIG. 2 is a view corresponding to FIG. 1 and showing the magnetic flux paths in the actuator produced by the permanent magnets.

FIG. 2 illustrates the magnetic flux path produced by the permanent magnets for the arrangement illustrated in FIG. 1. As can be seen, magnetic flux forms a closed loop in the shaft 11 and the back iron cylinder 16 with air gaps between the pole faces of the permanent magnets 12 and 13 and the back iron cylinder 16. Magnetic efficiency is improved if the windings 14 and 15 can be kept as thin as possible to minimise the air gap between the pole faces of the magnets 12 and 13 and the cylinder 16.

Figure 3:
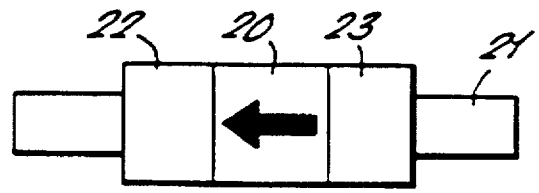
FIGS. 3 and 4 illustrate alternative forms of actuator member for the magnetic actuator illustrated in FIGS. 1 or 2.

FIG. 3 illustrates an alternative method of forming the actuator member of the magnetic actuator. A single axially magnetised permanent magnet 20 is mounted coaxially on a shaft 21 between pole pieces 22 and 23 of soft ferromagnetic material. The presence of the pole pieces 22 and 23 of soft iron tends to present a radial magnetic field from the cylindrical surfaces of the pole pieces 22 and 23, mimicking the field structure of the arrangement described with reference to FIG. 1. The ratio of the magnetic pole face area of the permanent magnet 20 (the end faces of the magnet 20) to the area of the cylindrical surfaces of the pole pieces 22 and 23 can be selected empirically to provide a desired degree of focusing or defocusing of the magnetic flux.

Figure 4:
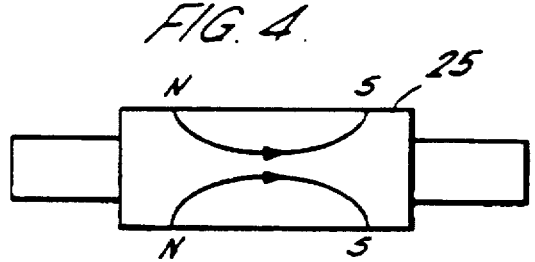
Figure 4A:
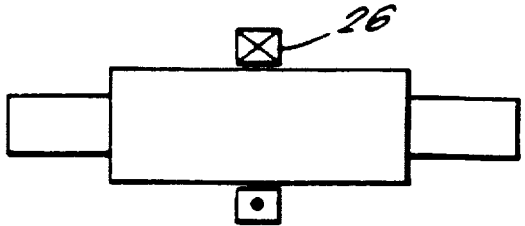
FIG. 4a illustrates how the permanent magnet for the actuator member of FIG. 4 can be formed.

Referring to FIGS. 4 and 4a, a further method of producing the permanent magnetic of the actuator member is shown, in which a single cylinder 25 of isotropic permanent magnet material is magnetised to imprint a two pole pattern which is self shielding, so that it has the flux return path within itself and does not require a magnetic centre limb of soft iron. The isotropic material is magnetised in effect to provide opposed magnetic poles at portions of the cylindrical faces at opposite ends of the cylinder 25. FIG. 4a illustrates how this pattern of magnetisation can be achieved using a centrally located magnetising coil 26.

Figure 5:
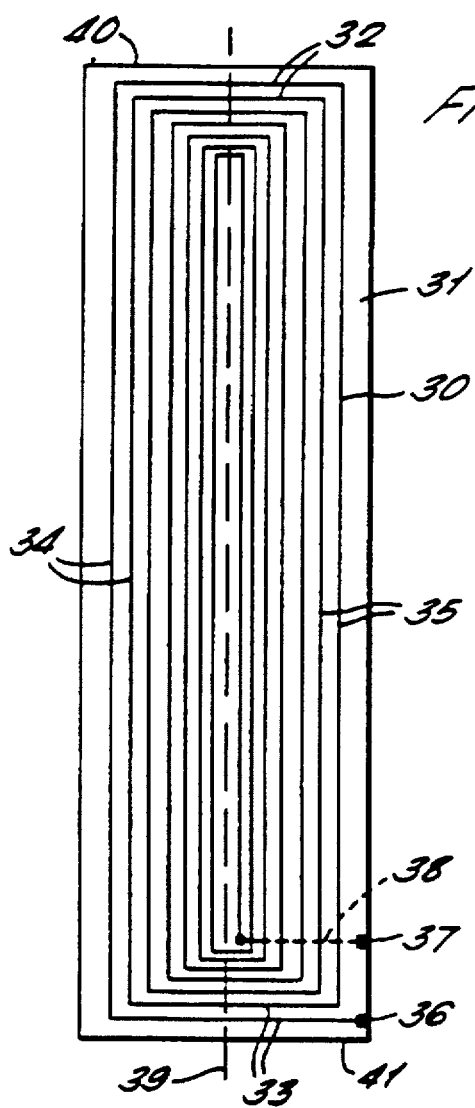
FIG. 5 is a plan view of an insulating substrate with a conductive track thereon for use in forming the stator windings of the magnetic actuator in accordance with a preferred embodiment of the invention.
Figure 6:
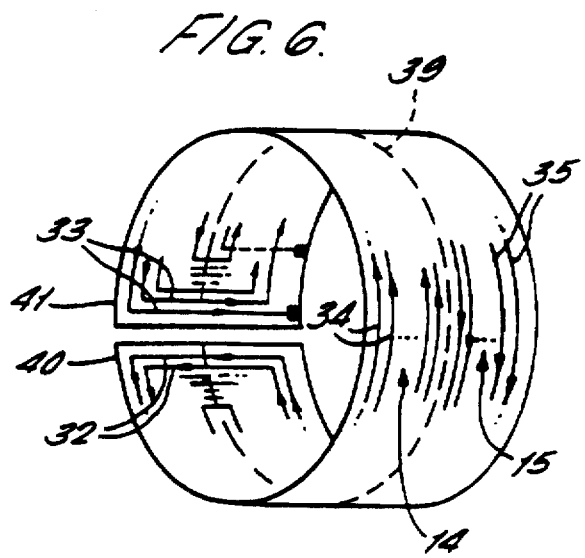
FIG. 6 is a perspective view of the substrate with conductive track thereon of FIG. 5 rolled up to produce the stator windings.

FIGS. 5 and 6 illustrate a method of producing the opposed stator windings 14 and 15 for the magnetic actuator described above. In FIG. 5, an electrically conductive track 30 is provided on an electrically insulating substrate 31. The track is provided in the form of a rectangular spiral as shown in FIG. 5, which may typically have shorter upper and lower end elements 32 and 33 interconnecting longer side elements 34 and 35. The spiral track as shown in FIG. 5 has a first end connection pad 36 connected to the outside of the spiral and a second connection pad 37 connected to the inner end of the spiral, e.g. by plated through holes interconnecting with a track length 38 formed on the reverse side of the substrate 31.

The substrate is conveniently made of a flexible material and the conductive track 30 is also made sufficiently thin so as to be flexible. Known techniques for making flexible printed circuits can be used for this purpose.

Importantly, this spiral is formed so as to have an equal number of vertical elements 34 and 35 on opposite sides of a central line 39.

Referring now to FIG. 6, the printed circuit spiral of FIG. 5 is shown rolled around so that the upper and lower ends 40 and 41 substantially abut. It can then be seen that the rolled up spiral produces in effect the two opposed polarity stator windings 14 and 15 of FIGS. 1 to 3. The stator winding 14 is formed by the longer vertical elements 34 of the rectangular spiral whereas the stator winding 15 is formed by the longer vertical elements 35 of the spiral on the opposite side of the central line 39. The shorter interconnecting elements 32 and 33 interconnecting the longer elements 34 and 35 are now located adjacent each other where the two ends 40 and 41 of the substrate abut. Because the current flowing in the elements 33 is in the opposite direction to that flowing in the elements 32, the effect of these elements is substantially neutral.

Preferably, the flexible substrate 31 is rolled up as in 57 with the deposited conductive track on the inside of the resulting cylinder. As a result the conducting track forming the stator windings 14 and 15 is available as close as possible to the pole faces of the permanent magnets 12 and 13 of the actuator member. At the same time, the insulating substrate 31 can be made very thin so as to minimise the distance between the windings 14 and 15 and the back iron provided by the soft iron cylinder 16. Because the overall thickness of the stator windings formed in this way can be very low, the air gap between the pole faces of the permanent magnet and the soft iron cylinder 16 can be kept to a minimum. Still further, the conductive track 30 can be very thin whilst still being wide enough (in the plane of the spiral) to accommodate the required current without excessive resistive losses. This structure again can maximise magnetic efficiency of the actuator.

Figure 7A:
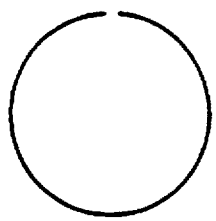
FIGS. 7a to 7c are schematic cross-sectional views of the rolled up stator winding substrate of FIGS. 5 and 6 illustrating three different possible arrangements.

In FIG. 6, the substrate with conductive track thereon is shown rolled so that the opposite ends 40 and 41 abut. This structure may be satisfactory in many applications. The effect of current flowing axially along track elements 32 and 33 in the resulting winding structure would be to produce opposed circumferential forces on the permanent magnets 12 and 13. For good efficiency, however, it should be noted that the circumferential distance occupied by the axially extending track elements 32 and 33 should not be a substantial proportion of the total circumference of the winding structure. The arrangement of FIG. 6 is shown schematically in cross-section in FIG. 7a.

Figure 7B:
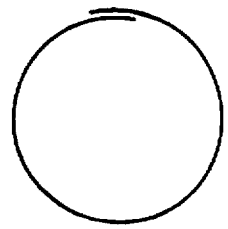

If it is desired to substantially eliminate altogether the effect of the current flowing in the cross elements 32 and 33 of the spiral, then the ends 40 and 41 of the substrate may be overlapped as shown in FIG. 7b, so that the currents substantially cancel each other out.

Figure 7C:
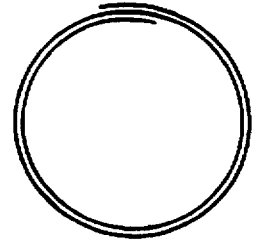

Additional current density in the windings 14 and 15 may be provided by forming the spiral 30 on the substrate 31 longer than as shown in FIG. 5 and then rolling it twice or more times upon itself to produce the structure shown schematically in cross-section in FIG. 7c.

The magnetic actuator described above in its various embodiments has particular application to diaphragm pumps such as may be used for the inflation of various pneumatic devices. An example of diaphragm pump incorporating a magnetic actuator embodying the present invention is illustrated schematically in FIG. 8. A magnetic actuator 50 for the diaphragm pump corresponds to that described above with reference to FIG. 1. The shaft 11 of the actuator is connected by a connecting rod 51 to the centre of a flexible diaphragm 52 mounted in a housing 53 to provide an enclosed space 54 behind the diaphragm. A one way valve 55 allows air to be sucked in to the space 54 through an inlet 56 when the diaphragm 52 is moved to the right in FIG. 8, and a one way valve 57 allows air to be forced out of the space 54 through an outlet 58 when the diaphragm 52 is moved to the left in FIG. 8.

The movement of the diaphragm 52 is accomplished by the actuator 50 producing a reciprocating axial motion in the shaft 11 and the associated connecting rod 51. The stator windings 14 and 15 of the actuator 50 are energised from a supply of alternating current shown schematically at 59.

Significantly, the actuator 50 may be designed so that the spacing d between the opposite poles of the magnet formed in the reciprocating member corresponds not only to the axial length of each of the stator windings 14 and 15, but also to the maximum displacement required for the diaphragm 52. In this way, displacement of the diaphragm 52 is restricted to the distance d by the magnetic displacement limit of the actuator member within the actuator 50, without the need for any mechanical end stops.

It will be appreciated that the opposite end of the shaft 11 may be connected similarly to a second diaphragm arrangement, shown in ghost to the right in FIG. 8, so that the air output of the pump can be doubled.

In the examples described hitherto, the actuator member is shown to be solid, but, in order to reduce mass it can be made as a hollow tube.

Among further advantages of the magnetic actuator described above, is that the stator windings are located immediately adjacent the outer soft iron cylinder or sheath which thereby provides good thermal dissipation. In addition, the design of the above described embodiments ensures that any forces transverse to the axis of movement are balanced to minimise loading of the bearing surfaces carrying the actuator member.

As mentioned previously herein the above described arrangement of magnetic actuator has a "magnetic end stop" effect when one of the magnetic poles of the actuator member reaches the interface between the two opposed stator windings. If the actuator is to be used with an energising current which can reverse polarity when the actuator member is approaching this magnetic end stop, then the actuator should normally be used in an application in which there is an external centring force on the actuator member. Then the actuator member will come to rest at the end of a stroke just before the position at which the net axial magnetic forces on the member fall to zero and reverse, so that on reversal of the electric field the member experiences an axial force in the opposite direction. Otherwise, there is a possibility that the actuator member may be just beyond the zero net axial force position when the current reverses, so that an increasing magnetic force is then produced which would tend to push the member further out of the stator windings.

The above discussion of providing a "magnetic end stop" assumes that the adjacent stator windings of the actuator substantially abut at the interface between the two. In fact, an actuator can be made with a substantial space between the two adjacent stator windings, whereupon the relationship between the maximum displacement of the actuator member and the distance between the magnetic poles thereon is no longer appropriate. For good performance of the magnetic actuator, the stator windings should be sufficiently long, in the direction of movement of the actuator member 11, so as completely to cover the magnetic pole faces of the actuator member for all positions of the actuator member over its full stroke. This implies that the stator windings should be approximately equal to the axial length of a magnetic pole face plus the intended maximum displacement of the actuator member within the stator.

Referring now to FIG. 9, a modified arrangement is illustrated in which there is indeed a small gap between the adjacent stator windings 14 and 15, the gap containing a sense winding 60. The sense winding 60 is located between the stator windings in a null position in the magnetic fields formed by the opposed currents flowing in the two stator windings. In this way, the energising currents flowing in the stator windings should produce zero induced current in the sensor winding 60.

However, movement of the permanent magnets 12 and 13 will induce a voltage on the sensor winding 60 proportional to the velocity of movement. Thus, a signal can be derived from the sensor winding 60 along line 61 which is indicative of the velocity of movement of the actuator member.

For maximum efficiency, it is desirable to operate the magnetic actuator in mechanical resonance. The resonant frequency will depend on the mechanical loading on the shaft 11 which can vary during operation. Accordingly, in a preferred arrangement, the energising current to the stator windings 14 and 15 is provided from a controlled oscillator 62. The signal on lines 61 from the sensor winding 60 indicating velocity of the shaft 11 are then compared in a phase comparator 63 with the energising current supplied to the stator windings from the oscillator 62. This phase comparison provides a monotonic relationship enabling a control signal 64 to be derived in the phase comparator to drive the output frequency of the controlled oscillator 62 to achieve mechanical resonance.

Figure 10:
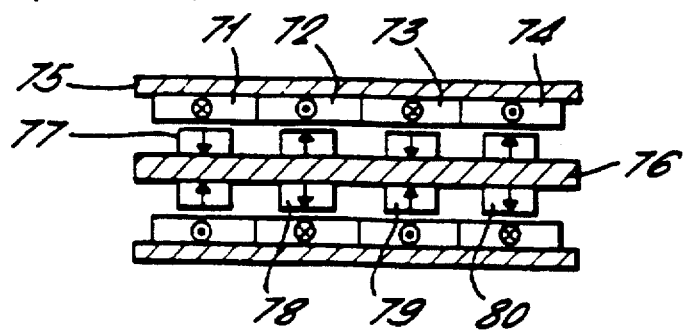
FIG. 10 is a schematic cross-sectional view of a still further embodiment of the magnetic actuator incorporating two pairs of stator windings and magnetic poles.

Referring now to FIG. 10, a further embodiment of the magnetic actuator is illustrated formed from two pairs of stator windings and corresponding pairs of permanent magnet poles. Thus, in the illustrated embodiment, successive stator windings 71, 72, 73 and 74 are provided connected together in alternating polarity as illustrated. The stator windings are all of substantially the same length in the direction of movement of the actuator member and are located inside a common soft iron cylinder 75 forming a back iron piece. The actuator member comprises a shaft 76 of soft iron on which are located four annular permanent magnets 77, 78, 79 and 80 of alternating magnetic polarity.

The actuator as illustrated in FIG. 10 operates in the same fashion as the embodiments described previously and each stator winding 71 has a length, in the direction of movement of the actuator member, approximately equal to the axial length of the cylindrical faces of the magnetic poles 77 to 80 plus the maximum displacement of the actuator member.

The provision of multiple stator windings and corresponding magnetic pole faces as illustrated in FIG. 10 has the advantage of enabling the quantity of soft iron in the shaft 76 to be reduced. It will be appreciated that, for the same total magnetic flux extending radially from the four magnetic pole faces to the back iron piece 75, the quantity of flux linking any adjacent pair of annular permanent magnets along the shaft 76 can be reduced. As a result, the actuator member may be made lighter so that the magnetic actuator has greater total efficiency.

Although the multiple pole arrangement illustrated in FIG. 10 is shown formed using annular permanent magnets, in the manner of the embodiment illustrated in FIGS. 1 and 2, advantages may also be obtained by making the actuator member with a series of axial permanent magnets in opposites polarities with intervening soft iron discs, in the manner of FIG. 3.

Although the annular permanent magnet described with respect of the embodiments illustrated in FIG. 1 and FIG. 10, are each shown as single pieces of predetermined axial length, each of these annular magnets may in fact be formed of a plurality of axially shorter, washer-like annular magnets held axially together to build up the desired total axial length for a single magnet. It is easier and cheaper to make axially short radial magnets.

Figure 11:
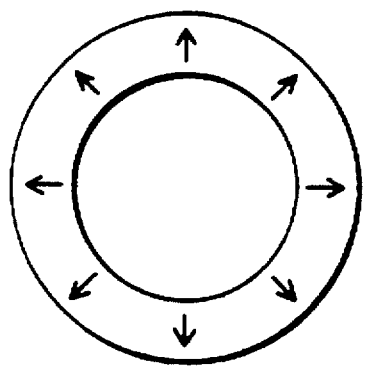
FIG. 11 is a schematic view illustrating the ideal radial magnetisation of an annular permanent magnet for use in the magnetic actuator of embodiments of the invention.
Figure 12A:
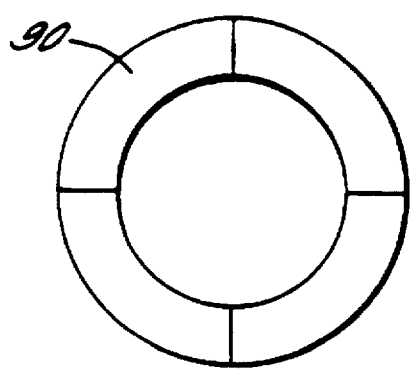
FIGS. 12a and 12b illustrate a simplified form of annular permanent magnet which is easier to magnetise.
Figure 12B:

Referring now to FIGS. 11 and 12a and 12b, FIG. 11 is a plan view illustrating the magnetisation of an ideal annular permanent magnet. Although such magnets can indeed be made, it is difficult and relatively expensive to make annular magnets of this kind with powerful radial fields. Accordingly, it may be preferable in the embodiments of the present invention to make up a quasi radial annular magnet from a number of annular segments 90 as shown in FIG. 12a. Each segment 90 can then be magnetised linearly (or diametrically) as illustrated in FIG. 12b. When four segments 90 are assembled to form the complete annulus as shown in FIG. 12a, the resulting magnet has a quasi radial field as required. Clearly, the annulus of FIG. 12a should be split up into at least two and preferably three or more segments so that the resulting magnetic field approximates the desired radial field.

Figure 13:
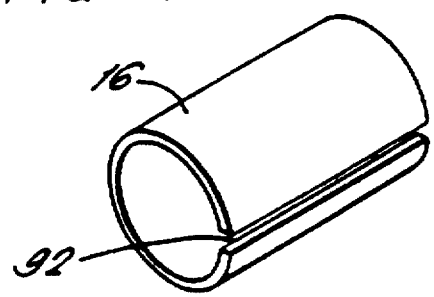
FIG. 13 is a perspective view of a modified form of soft iron shell for the actuator.

Any of the embodiments of magnetic actuator described above may be further modified by providing an axially extending gap 92 along the length of the cylindrical soft iron shell 16 providing the back iron, as illustrated in FIG. 13. This gap 92 prevents the flow of circumferential eddy currents in the shell 16 which may be induced by axial movement of the permanent magnets on the actuator member. Also, the gap 92 can provide a convenient passage for wires connected to the stator windings and sensor winding of the actuator.

We claim:

1. A linear magnetic actuator comprising a pair of stator windings arranged to carry currents providing magnetic fields of opposed polarity and arranged adjacent one another along a line substantially perpendicular to the directions of current flow in the windings, a permanent magnet actuator member mounted for movement along a path parallel to said line and having opposite magnetic poles with a predetermined spacing along said path such that in a de-energized state of the actuator each magnetic pole is proximate a respective one of the stator windings, a slotless stator back iron piece extending parallel to said line behind the stator windings relative to the actuator member and having a face closest to the actuator member which is flat in directions parallel to said line over the extent of the back iron piece, and a sense coil located at a null field point between the stator windings to sense the velocity of movement of the actuator member.

2. An actuator member as claimed in claim 1, wherein each magnetic pole has a face which extends a predetermined width along said line and each stator winding comprises a plurality of turns extending evenly along said line for not less than said width of the corresponding pole face.

3. An actuator member as claimed in claim 2, wherein the actuator member has a predetermined maximum displacement and each stator winding extends along said line for a distance not substantially greater than said width plus said predetermined displacement.

4. An actuator as claimed in any of claims 1–3 wherein the actuator member has magnetic pole faces extending substantially parallel to said line.

5. An actuator as claimed in any of claims 1–3 wherein the stator windings are generally cylindrical centred on an axis parallel to said line and the actuator member has cylindrical symmetry about said axis.

6. An actuator as claimed in claim 5 wherein the actuator member has pole faces which are substantially cylindrical.

7. An actuator as claimed in claim 6 wherein the actuator member comprises a shaft of soft ferromagnetic material and a pair of oppositely radially magnetised annular permanent magnets located at said spacing along the shaft.

8. An actuator as claimed in claim 7, wherein at least one of the annular permanent magnets comprises a plurality of axially shorter, washer-like annular magnets held axially together.

9. An actuator as claimed in claim 7 wherein at least one of the annular magnets is formed from at least two annular segments, wherein each segment is magetised linearly along a radius of the segment.

10. An actuator as claimed in claim 5 wherein the actuator member comprises an axially aligned permanent magnet and soft ferromagnetic pole pieces at each end of the magnet to direct magnetic flux radially.

11. An actuator as claimed in claim 5 wherein the actuator member comprises a permanent magnet of isotropic magnet material magnetised to direct flux substantially radially at each pole.

12. An actuator as claimed in claim 5, wherein the stator back iron piece is a cylinder of soft ferromagnetic material surrounding the stator windings.

13. An actuator as claimed in claim 12, wherein said cylinder of soft ferromagnetic material has an axial gap along the length of the cylinder to impede circumferential eddy currents.

14. An actuator as claimed in claim 5, wherein the stator windings comprise at least one flexible substrate sheet of electrically insulating material, and a conductive track formed on the substrate in a rectangular spiral, the substrate and track thereon being rolled into a cylinder having its axis parallel to one pair of opposed sides of the rectangular spiral so that the conductive track elements of the other pair of opposed sides constitute respectively turns of the two opposed polarity stator windings.

15. An actuator as claimed in claim 14 wherein the substrate with track thereon is rolled so that the track elements of said one pair of opposed sides of the spiral substantially overlie one another.

16. An actuator as claimed in claim 14 wherein the substrate with track thereon is rolled to produce more than one layer of substrate and track elements forming the walls of the cylinder.

17. An actuator as claimed in claim 5 including at least one additional stator winding adjacent to one of said pair of windings along said line and of opposite polarity to said adjacent winding, and the actuator member having a corresponding additional magnetic pole spaced along said path of movement from and of opposite magnetic polarity to an adjacent one of said opposite magnetic poles so as to be proximate said additional stator winding.

18. An actuator as claimed in claim 17 in which there are at least two pairs of stator windings and associated magnetic poles.

19. An actuator as claimed in claim 1 and including a variable frequency oscillator to provide an energising supply to the stator windings and resonance control circuitry responsive to signals from the sense coil indicating the velocity of the actuator member to control the oscillator frequency to bring the actuator into mechancial resonance.

* * * * *